N. ULLELAND.
QUICK ACTING HOSE COUPLING.
APPLICATION FILED MAY 1, 1917.
1,253,309.
Patented Jan. 15, 1918.
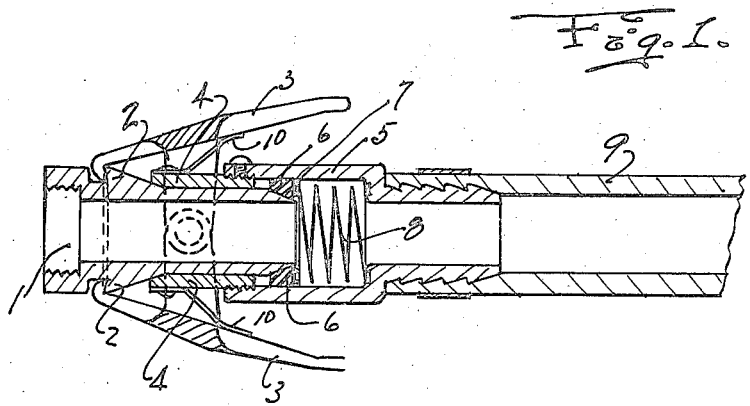
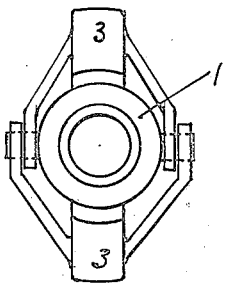
INVENTOR
Nels Ulleland
BY
Fred C. Town
ATTORNEY

UNITED STATES PATENT OFFICE.

NELS ULLELAND, OF KENT, WASHINGTON.

QUICK-ACTING HOSE-COUPLING.

1,253,309.

Specification of Letters Patent.

Patented Jan. 15, 1918.

Application filed May 1, 1917. Serial No. 165,793.

*To all whom it may concern:*

Be it known that I, NELS ULLELAND, a citizen of the United States, residing at Kent, in the county of King and State of Washington, have invented certain new and useful Improvements in Quick-Acting Hose-Couplings, of which the following is a specification.

This invention relates to quick acting hose connections and has for its office to provide an improved and novel form of quick acting hose coupling for connecting hose to faucet.

Other objects will appear as my invention is more fully explained in the following specification, illustrated in the accompanying drawings and pointed out in the appended claim.

In the drawings Figure 1 is central cross section of my device. Fig. 2 is an end elevation of same.

Referring more particularly to the drawings numeral 1 indicates a threaded faucet extension which is adapted to be screwed on to the threaded end of the faucet. An annular shoulder 2 is provided around the extension member 1. The face of shoulder 2 is slightly under cut in order to provide a grip for pawl levers 3 which are pivoted to a sleeve 4. Sleeve 4 fits slidably outside of the outer end of extension member 1 and is connected by means of threads to cylindrical hose extension member 5. Hose extension member 5 is of greater diameter than sleeve 4 and therefore is also of greater diameter than the outer end of faucet extension member 1. Faucet extension member 1 is tapered at its outer end and projects beyond the sleeve 4 and into the chamber of the hose extension member 5. A gasket 6 of resilient material fits snugly and slidably inside of the chamber of the hose extension member and against the tapered surface of the faucet extension member. A cut washer 7 backs the gasket up and provides a seat for one end of a spring 8 which holds the gasket tightly in place. The gasket is so positioned that the pressure of a fluid within the members mentioned would tend to make the gasket tighter rather than looser. A hose 9 is clamped to the outer end of the hose extension member 5 in the usual manner. Springs 10 hold the pawl levers 3 in engagement with shoulder 2. When disconnected the sleeve 4 prevents the gasket 7 from leaving the chamber of member 5. In order to connect the hose to the faucet it is necessary that member 1 be permanently secured to the faucet and that the other members be secured to the end of the hose in the relation shown. The tapered end of the faucet extension member is then inserted between the pawl levers 3 and within the sleeve 4. As the members are shoved tightly together the ends of the pawl will snap over shoulder 2 and therefore secure the device against separation as shown in Fig. 1. In order to loosen the hose from the faucet it is only necessary to depress the outer ends of pawl levers 3 therefore disengaging the inner ends with the shoulders 2 which allows the sleeve to separate from the faucet connection member 1. My device is quickly and easily applied, requires no wrench and will maintain itself water tight.

While I have shown a particular form of embodiment of my invention, I am aware that many minor changes therein will readily suggest themselves to others skilled in the art without departing from the spirit and scope of the invention, and I therefore desire to avoid being limited to the exact form shown and described.

Having described my invention, what I claim as new and desire to protect by Letters Patent, is:—

In the device of the class described, the combination of a faucet extension member which is adapted to be secured to the end of a faucet, an annular under cut shoulder integral with the faucet extension member, a tapered portion on the extreme outer end of the faucet extension member, a chambered hose extension member of which the internal diameter of the chambered portion is of greater diameter than the external diameter of the tapered portion of the faucet extension member, a sleeve adjustably secured within the end of the chambered portion of the said hose extension member and slidably fitting over the outer portion of the said faucet extension member, pawl levers pivotally secured to the said sleeve members and adapted to engage the shoulder upon the faucet extension member, a tapered gasket intermediate the tapered portion of the faucet extension member and the inner walls of the chambered portion of the hose extension member, and spring means for normally maintaining the gasket in tight relationship between the said members.

In testimony whereof I affix my signature.

NELS ULLELAND.